United States Patent Office 3,105,090
Patented Sept. 24, 1963

3,105,090
DERIVATIVES OF ALKYL BENZOIC ACID AND
SALTS THEREOF WITH BASES
Frederick Leonard, Yonkers, N.Y.
No Drawing. Filed Sept. 20, 1960, Ser. No. 57,144
6 Claims. (Cl. 260—521)

This invention relates to novel alkylbenzoic acid derivatives and the pharmaceutically acceptable salts thereof with bases as well as to processes for their manufacture.

It has now been found that compounds of the general formula:

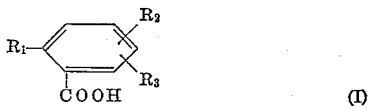

wherein $R_1$ represents alkoxy, cycloalkoxy, aralkoxy, aryloxy, acyloxy, halogen or trifluoromethyl, $R_2$ represents hydrogen, halogen or alkyl, $R_3$ represents hydroxyalkyl, carboxyalkoxyalkyl, acyloxyalkyl, aroyloxyalkyl, heteroyloxyalkyl, alkoxyalkyl, cycloalkoxyalkyl, alkenoxyalkyl, alkynoxyalkyl, haloalkoxyalkyl, hydroxyalkoxyalkyl, arylalkoxyalkyl, carboxyalkylmercaptoalkyl, acylmercaptoalkyl, aroylmercaptoalkyl, heteroylmercaptoalkyl, alkylmercaptoalkyl, cycloalkylmercaptoalkyl, alkenylmercaptoalkyl, alkynylmercaptoalkyl, haloalkylmercaptoalkyl, hydroxyalkylmercaptoalkyl, arylalkylmercaptoalkyl, carboxyalkylsulfonylalkyl, alkylsulfonylalkyl, cycloalkylsulfonylalkyl, alkenylsulfonylalkyl, alkynylsulfonylalkyl, haloalkylsulfonylalkyl, hydroxyalkylsulfonylalkyl, arylalkylsulfonylalkyl, carboxyalkylsulfinylalkyl, alkylsulfinylalkyl, cycloalkylsulfinylalkyl, alkenylsulfinylalkyl, alkynylsulfinylalkyl, haloalkylsulfinylalkyl, hydroxyalkylsulfinylalkyl, or arylalkylsulfinylalkyl, and the nontoxic pharmaceutically acceptable salts thereof with bases, such as e.g. alkali metal hydroxide, i.e. sodium hydroxide, potassium hydroxide, etc., ammonium hydroxide, and amines, such as alkyl amines, e.g. dimethyl amine, triethyl amine, triethanol amine, etc., have valuable pharmacological properties, in particular, analgesic and/or diuretic activity.

The compounds of the Formula I are especially useful as fast acting analgesic agents of low toxicity which may be administered perorally in the form of the free acid or salts thereof as described above, e.g. in capsules or tablets having from about 150 mgs. to about 300 mgs. therein. One or two such capsules or tablets are taken at intervals, e.g. every 4 hours, for the relief of pain. The novel analgetic agents of the invention may be also administered parenterally in the form of the free acid or salts thereof as set forth above.

Compounds of the Formula I are also useful as diuretic agents. Thus a dual effect may be realized with such compounds.

Presently preferred compounds of the general Formula I are the acids of the formula:

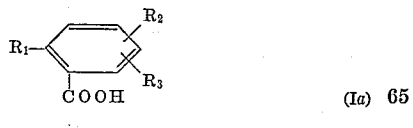

wherein $R_1$ represents lower alkoxy, especially methoxy or ethoxy; or phenoxy; or halogen, such as F, Cl, Br, I, preferably Cl, $R_2$ represents lower alkyl, e.g. methyl, ethyl, propyl, butyl, pentyl, hexyl; or hydrogen, and $R_3$ represents lower alkoxymethyl, e.g. methoxymethyl, ethoxymethyl, propoxymethyl, butoxymethyl, pentoxymethyl, hexoxymethyl; or carboxymethoxymethyl; or lower alkenoxymethyl, especially allyloxymethyl; or lower alkynoxymethyl, especially propargyloxymethyl; or cyclo-lower-alkoxymethyl, especially cyclopentoxymethyl; or lower haloalkoxymethyl, especially 2-chloroethoxymethyl; or lower hydroxyalkyl, especially hydroxymethyl; or lower hydroxyalkoxymethyl, especially 2,3-dihydroxypropoxymethyl; or phenyl-lower-alkoxymethyl, especially benzyloxymethyl; or lower alkylmercaptomethyl, especially ethylmercaptomethyl; or lower alkylsulfonylmethyl, especially ethylsulfonylmethyl, and the pharmaceutically acceptable, nontoxic salts of the said acids with bases, e.g. the alkali metal hydroxides, NaOH, KOH, etc.

The compounds of the Formula I are prepared in a number of ways. In one method, an appropriate alcoholate or mercaptide is reacted with a halomethyl derivative of benzoic acid to yield a desired methylbenzoic acid derivative, as in the following equation:

(1)
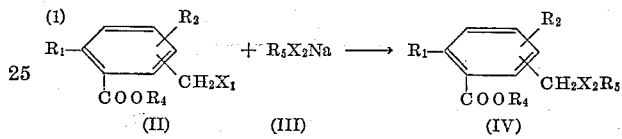

wherein $R_1$ and $R_2$ are as defined above, $R_5$ may be an alkyl group, especially methyl, ethyl, propyl, butyl or hexyl; carboxyalkyl, e.g. carboxymethyl, carboxyethyl, carboxypropyl, carboxybutyl, etc.; carboxyaryl, e.g. carboxyphenyl, carboxytolyl, etc.; alkenyl, e.g. vinyl, allyl, butenyl, pentenyl, etc.; alkynyl, e.g. ethynyl, propargyl, etc.; cycloalkyl, e.g. cyclopentyl, etc.; haloalkyl, e.g. chloromethyl, fluoromethyl, chloroethyl, bromoethyl, chloropropyl, chlorobutyl, etc.; hydroxyalkyl, e.g. hydroxymethyl, hydroxyethyl, hydroxypropyl, hydroxybutyl, etc.; phenylalkyl, e.g. benzyl, phenylethyl, etc., $X_1$ is a halogen atom, e.g. Cl, F, Br, I, $X_2$ is a sulfur atom or oxygen atom, and $R_4$ may be hydrogen or alkali metal, e.g. Na or K, or $NH_4$, or an alkylamine group, or an alkyl group, e.g. methyl or ethyl.

If, in Reaction 1, $R_4$ is an alkyl group, then the free acid of (IV) may be obtained by saponification and hydrolysis. At times it may be more convenient to carry out Reaction 1 with (II) as the ester, rather than the free acid.

In a variation of this first method, the 5-halomethyl salicylic acid or ester thereof is reacted with an alcoholate or mercaptide and the product obtained from this reaction is treated with an organic halide to yield the desired derivative of benzoic acid or ester thereof which is saponified to a compound of the general Formula VIII as shown in the following equation:

(1a)
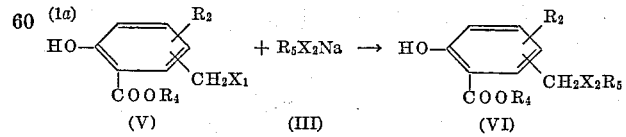

(1b)
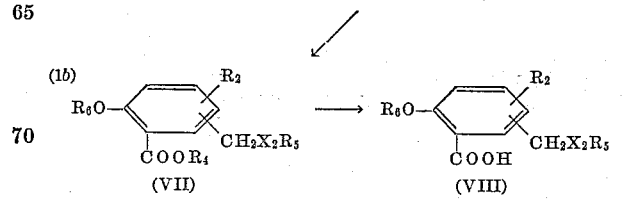

wherein $R_2$, $R_4$, $R_5$, $X_1$ and $X_2$ are as defined above, and
$R_6$ is alkyl, e.g. methyl, ethyl, propyl, butyl, pentyl, hexyl, etc. or phenyl.

Alternative, the hydroxymethylbenzoic acid derivative, the salt thereof, or the ester thereof, is reacted in the presence of sodium and a halide to produce a desired substituted methylbenzoic acid derivative, according to the following equation:

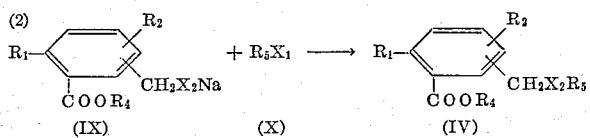

wherein $R_1$, $R_2$, $R_4$, $R_5$, $X_1$ and $X_2$ are defined as above.

Here again, since the free acid (IV) is desired, saponification and hydrolysis are necessary when in (IX), $R_4$ is an alkyl group.

In still another method of preparing the compounds of the formula I, a hydroxymethylbenzoic acid derivative (XI) is reacted with an organic acid anhydride (XII) to yield the corresponding ester (XIII) according to the following equation:

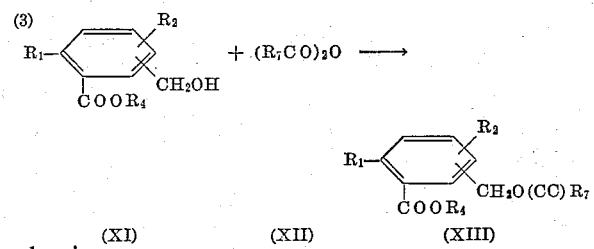

wherein $R_1$, $R_2$ and $R_4$ are as defined above, and
$R_7$ is alkyl, e.g. methyl, ethyl, propyl, butyl, hexyl, etc.; or aryl, e.g. phenyl or substituted phenyl; or heteryl.

In a further method for the preparation of the compounds of the Formula I, an organic halide is reacted directly with the benzoic acid derivative to yield the corresponding appropriate benzoic acid derivative according to the following equation:

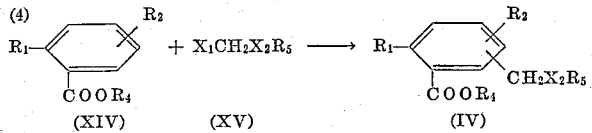

wherein $R_1$, $R_2$, $R_4$, $R_5$, $X_1$ and $X_2$ are as defined above.

Once again, the free acid of (IV) is obtained on hydrolysis of the ester, for example:

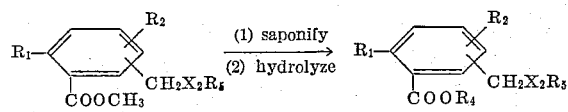

In a further alternative method for the preparation of compounds within the formula I, an appropriate mercapto-methyl derivative of benzoic acid, or the salts or esters thereof, is oxidized under controlled conditions to yield the corresponding sulfone or sulfoxide as in Equations 5 and 6:

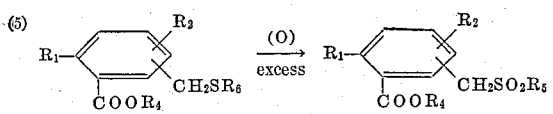

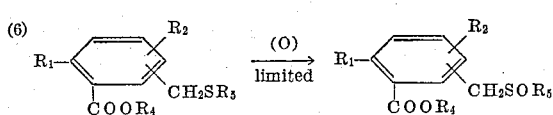

$R_1$, $R_2$, $R_4$ and $R_5$ being defined as above.

In this specification the term "lower," e.g. "lower alkyl," generally represents a group containing 1 to 6 carbon atoms.

The following examples are set forth in order to illustrate the invention which is by no means limited thereto. In said examples, parts are by weight; unless otherwise specified, the relationship between parts by weight and parts by volume being that of grams to cubic centimeters. The temperatures are in degrees centigrade.

EXAMPLE 1.—2-METHOXY-5-ETHOXYMETHYL-BENZOIC ACID

A solution of sodium ethylate is prepared from 1.3 parts of sodium and 100 parts by volume of ethanol. To this solution are added 10 parts of 2-methoxy-5-chloromethylbenzoic acid dissolved in 50 parts by volume of ethanol. The mixture is stirred and refluxed for 4 hours and concentrated in vacuo. The residue is suspended in 100 parts by volume of water and acidified to Congo red with concentrated hydrochloric acid. The oil which separates is extracted twice with 100 parts each of ethyl acetate. The extract is dried over anhydrous sodium sulfate. The sodium sulfate is filtered off, and the filtrate is concentrated in vacuo. The yellow residue which remains, crystallizes on standing in the refrigerator.

2-methoxy-5-ethoxymethylbenzoic acid is obtained as a white crystalline compound after recrystallization by dissolution in the minimum volume of hot ethyl acetate and addition of petroleum ether until the first appearance of turbidity. It melts at 53–54°, the yield being 3.5 parts.

EXAMPLE 2.—SODIUM 2-METHOXY-5-METHOXY-METHYLBENZOATE 10 parts of methyl 2-methoxy-5-methoxymethylbenzoate are refluxed in 100 parts by volume of 10% sodium hydroxide for a period of 12 hours. The reaction mixture is cooled and the pH is adjusted to Congo red with hydrochloric acid. The reaction mixture is extracted with ether, dried over anhydrous sodium sulfate and concentrated. The remaining oil is dissolved in ethanol and the calculated amount of sodium in ethanol is added to the ethanol solution. Upon concentration of the mixture, sodium 2-methoxy-5-methoxymethylbenzoate is obtained as a crystalline compound, which melts at 277–278° after recrystallization from 95% ethanol. The yield is 6 parts.

EXAMPLE 3.—SODIUM 2-METHOXY-5-ISOPROPOXYMETHYLBENZOATE

A solution of sodium isopropoxide is prepared from 1.3 parts of sodium and 100 parts by volume of isopropyl alcohol. To this solution are added 10 parts of 2-methoxy-5-chloromethylbenzoic acid dissolved in 50 parts by volume of isopropyl alcohol. The resulting mixture is stirred and refluxed for 4 hours and then concentrated in vacuo. The residue therefrom is suspended in 100 parts by volume of water and acidified to Congo red with concentrated hydrochloric acid, the oil which separates being extracted twice with 100 parts by volume each of ethyl acetate. The extract is then dried over anhydrous sodium sulfate. The sodium sulfate is filtered off and the filtrate is concentrated in vacuo. The yellow residue is dissolved in 500 parts by volume of ethanol and treated with a solution of 1.9 parts of sodium hydroxide dissolved in 100 parts by volume of ethanol (95%). The resulting solution is concentrated in vacuo and the crystalline residue is recrystallized from the minimum volume of 95% ethanol. 4 parts of sodium 2-methoxy-5-isopropoxymethylbenzoate are thus obtained, which melt at 275–276°.

EXAMPLE 4.—SODIUM 2-METHOXY-5-n-BUTOXY-METHYLBENZOATE

When 10 parts of 2-methoxy-5-chloromethylbenzoic acid dissolved in 200 parts by volume of n-butyl alcohol are stirred and refluxed for 4 hours with a solution of sodium butoxide in n-butanol (1.3 parts of sodium dissolved in 150 parts by volume of n-butanol) and the reaction mixture is worked up as described in Example 3, there are obtained 4 parts of sodium 2-methoxy-5-n-butoxymethylbenzoate, which melt at 280–281° after recrystallization from a 1:1 mixture of ethanol and ether.

EXAMPLE 5.—3-CARBOXY-4-METHOXYBENZYL-OXYACETIC ACID (a) *Methyl 2-Methoxy-5-Chloromethylbenzoate*

300 parts of 2-methoxy-5-chloromethylbenzoic acid are dissolved in 1200 parts by volume of methanol. The resulting solution is treated to saturation (approximately 3 hours) with gaseous hydrogen chloride at such a rate that the methanol refluxes. The reaction mixture is allowed to cool overnight. The precipitated crystalline product, methyl 2-methoxy-5-chloromethylbenzoate, is removed by filtration, washed with a small amount of ice-cold methanol and dried. It melts at 64–65°, and the yield is 277 parts (86.3%).

(b) *Ethyl 3-Carbomethoxy-4-Methoxybenzyloxyacetate*

2.3 parts of sodium are dissolved in 150 parts by volume of ethanol and 10.4 parts of ethyl glycolate are added with stirring and the mixture is warmed at 50° for 15 minutes. The mixture is then concentrated to dryness, 100 parts by volume of diethyl carbonate are added, and then a solution of 23 parts of methyl 2-methoxy-5-chloromethylbenzoate in 100 parts by volume of diethyl carbonate is added at once. The mixture is heated to 100° and is refluxed and stirred for 5 hours. The reaction mixture is then concentrated in vacuo, 200 parts by volume of water are added, the pH of the reaction mixture is adjusted to Congo red and it is then extracted with ether. The ether layer is dried over anhydrous sodium sulfate and then concentrated. The resulting ethyl 3-carbomethoxy-4-methoxybenzyloxyacetate is distilled, the boiling point being at 170–175° under a pressure of 0.4 mm. Hg. The yield is 7 parts (25%).

(c) *3-Carboxy-4-Methoxybenzyloxyacetic Acid*

7 parts of ethyl 3-carbomethoxy-4-methoxybenzyloxyacetate are refluxed in 40 parts by volume of 2.5 N sodium hydroxide for 4 hours. The mixture is cooled and acidified to Congo red with concentrated hydrochloric acid. Upon cooling of the reaction mixture, the white crystalline compound of 3-carboxy-4-methoxybenzyloxyacetic acid is obtained. After recrystallization from dilute ethanol, it melts at 135–137°. The yield is 4.5 parts (75%).

EXAMPLE 6.—SODIUM 2-METHOXY-5-ALLYLOXY-METHYLBENZOATE

A mixture of sodium allyloxide, prepared by dissolving 1.15 parts of sodium in 100 parts by volume of allyl alcohol, and 10 parts of 2-methoxy-5-chloromethylbenzoic acid dissolved in 75 parts by volume of alcohol, is stirred and refluxed for 7 hours. The reaction mixture is worked up as described in Example 3. The crude reaction product is recrystallized by dissolution in the minimum volume of warm (60°) alcohol and by the addition of ether until the mixture becomes turbid. The crystallized product, sodium 2-methoxy-5-allyloxymethylbenzoate, is filtered off; it melts at 265–266°. The yield is 6 parts.

EXAMPLE 7.—2-METHOXY-5-PROPARGYLOXY-METHYLBENZOIC ACID

A solution of sodium propargylate is prepared from 1.3 parts of sodium and 100 parts by volume of propargyl alcohol. To this solution are added 10 parts of 2-methoxy-5-chloromethylbenzoic acid dissolved in 50 parts by volume of propargyl alcohol. The mixture is stirred and refluxed for 7 hours, and concentrated in vacuo. The residue is dissolved in 200 parts by volume of water and made acid with concentrated hydrochloric acid to pH 3.5. The oil which separates is extracted with ether and dried over anhydrous sodium sulfate. The ether is removed and the 2-methoxy-5-propargyloxymethylbenzoic acid crystalizes out. After recrystallization from a 9:1 mixture of ethanol and petroleum ether, it melts at 70°. The yield is 7 parts.

EXAMPLE 8.—SODIUM 2-METHOXY-5-CYCLO-PENTYLOXYMETHYLBENZOATE 1.2 parts of sodium are dissolved in 150 parts by volume of cyclopentanol. To this mixture is added a solution of 10 parts of 2-methoxy-5-chloromethylbenzoic acid dissolved in 50 parts by volume of cyclopentanol. The mixture is stirred and refluxed for 7 hours and worked up by the same method as that described in Example 3. The crude reaction product is recrystallized from the minimum volume of 95% ethanol. It melts at 296°. The yield is 3 parts.

EXAMPLE 9.—SODIUM 2-METHOXY-5-(β-CHLOROETHOXYMETHYL)BENZOATE

A solution of sodium 2-chloroethylate is prepared from 1.15 parts of sodium and 150 parts by volume of 2-chloroethanol. To this solution are added 10 parts of 2-methoxy-5-chloromethylbenzoic acid, dissolved in 100 parts by volume of benzene. The mixture is stirred and refluxed for 6 hours and concentrated in vacuo. The residue is dissolved in 200 parts by volume of water and made acid with concentrated hydrochloric acid to pH 3–3.5. The oil which separates is extracted with ether and dried over anhydrous sodium sulfate. The ether is then distilled off and the remaining oil of 2-methoxy-5-(β-chloroethoxymethyl)-benzoic acid is dissolved in alcohol and the solution is treated with the calculated amount of sodium hydroxide in 95% ethanol. The mixture is concentrated whereupon the crystalline compound of sodium 2-methoxy-5-(β-chloroethoxymethyl)benzoate is obtained. After recrystallization from a 2:1 mixture of ethanol and methanol, it melts at 250–251°. The yield is 3 parts (25–26%).

EXAMPLE 10.—SODIUM 2-METHOXY-5-(2,3-DIHYDROXYPROPOXYMETHYL)BENZOATE

A solution of sodium ethylate is prepared from 1.5 parts of sodium in 50 parts by volume of ethanol and 10 parts of methyl 2-methoxy-5-hydroxymethylbenzoate (boiling point 140–141° at 1.4 mm. Hg.) in 25 parts by volume of ethanol are added. The reaction mixture is stirred for 30 minutes at 50° and finally concentrated to dryness in vacuo. To the resulting dry mixture are added 6 parts of redistilled glycerol monochlorohydrin in 200 parts by volume of toluene. The reaction mixture is stirred and refluxed for 8 hours. It is then cooled and 200 parts by volume of water are added and the pH of the mixture is made to 3–3.5 with concentrated hydrochloric acid. The toluene layer of the reaction mixture is then separated and dried over anhydrous sodium sulfate. The sodium sulfate is filtered off and the filtrate is concentrated in vacuo. The syrupy residue is then refluxed with 100 parts by volume of 10% sodium hydroxide for 8 hours. The reaction mixture is cooled to 20°, acidified with concentrated hydrochloric acid to Congo red and extracted with ether. The ethereal solution is dried over anhydrous sodium sulfate and concentrated to give an oily residue of 2-methoxy-4-(2,3-dihydroxypropoxymethyl)-benzoic acid. The oil is dissolved in 50 parts by volume of 95% ethanol, and 1.9 parts of sodium hydroxide in 50 parts by volume of 95% ethanol are added. The mixture is concentrated in vacuo and a crystalline residue of sodium 2-methoxy-5-(2,3-dihydroxypropoxymethyl)-benzoate is obtained. After recrystallization from ethanol, the product melts at 285–286°. The yield is 2 parts (20%).

EXAMPLE 11.—SODIUM 2-METHOXY-5-BENZYLOXYMETHYLBENZOATE

Sodium benzyloxide, prepared by dissolving 1.2 parts of sodium in 150 parts by volume of benzyl alcohol, is added to a solution of 10 parts of 2-methoxy-5-chloromethylbenzoic acid in 100 parts by volume of benzene. The resulting mixture is stirred and refluxed for 10 hours and worked up by the same method as that described in Example 3. Crude sodium 2-methoxy-5-benzyloxymethylbenzoate is recrystallized from the minimum volume of hot 95% ethanol. The pure product melts at 279–280°. The yield is 7 parts.

EXAMPLE 12.—2-ETHOXY-5-ETHOXYMETHYLBENZOIC ACID

A solution of 10 parts of 2-methoxy-5-chloromethylbenzoic acid in 100 parts by volume of benzene is added to a solution of sodium ethoxide, prepared by dissolving 1.3 parts of sodium in 100 parts by volume of ethanol. The mixture is stirred and refluxed for 7 hours and worked up in the same way as described in Example 1. The crude residue of 2-ethoxy-5-ethoxymethylbenzoic acid so obtained is recrystallized from a 3:1 mixture of ethyl acetate and petroleum ether. The pure compound melts at 46–48°. The yield is 7.5 parts.

EXAMPLE 13.—SODIUM 2-PHENOXY-5-ETHOXYMETHYLBENZOATE (a) *Synthesis of Starting Materials*

2-chloro-5-methylacetophenone is prepared by a Friedel-Crafts reaction according to the procedure of Mayer and Freund (Be. 55, 2052). It distills at 99–100° under a pressure of 0.8 mm. Hg, $n_D^{24°}$ 1.5423, whereas Mayer and Freund report a boiling point at 245–246° and $n_D^{25°}$ 1.5419.

2-chloro-5-methylbenzoic acid is obtained by oxidation of 2-chloro-5-methylacetophenone with sodium hypobromite by the procedure described in Organic Syntheses, Coll. Vol. II, 428, for the preparation of β-naphthoic acid. It melts at 163–164°. Claus, J. Prakt. Chem. [2] 46, 27 obtains this compound by oxidation of 2-chloro-5-methylacetophenone with potassium manganate or dilute nitric acid. Lit. melting point 167°.

2-phenoxy-5-methylbenzoic acid is prepared by an Ullmann reaction. An interaction of potassium 2-chloro-5-methylbenzoate with potassium phenate in excess phenol takes place (see method of H. Stetter and G. Duve, Chem. Ber. 87, 1699, 1954) and produces a crude preparation of 2-phenoxy-5-methylbenzoic acid, melting at 85–90°. It is refluxed for 72 hours with a mixture of methanol ethylene dichloride and a trace of sulfuric acid (method of Clinton and Laskowski, J. Am. Chem. Soc. 70, 3136 1948), whereupon methyl 2-phenoxy-5-methylbenzoate is obtained, boiling at 141–142° under a pressure of 0.3 mm. Hg.

Methyl 2-phenoxy-5-bromomethylbenzoate is prepared by brominating methyl 2-phenoxy-5-methylbenzoate with N-bromosuccinimide in carbon tetrachloride. After work-up, the crude product is dissolved in benzene and passed through an aluminum oxide column. The benzene is evaporated in vacuo leaving an oily residue of methyl 2-phenoxy-5-bromomethylbenzoate.

(b) *Sodium 2-Phenoxy-5-Ethoxymethylbenzoate*

A solution of sodium ethylate is prepared from 0.69 part of sodium in 100 parts by volume of ethanol. To this solution 10 parts of methyl 2-phenoxy-5-bromomethylbenzoate in 100 parts by volume of benzene are added. The reaction mixture is stirred and refluxed for 10 hours. It is then cooled and 200 parts by volume of water are added and the pH of the mixture is made acid to Congo red with concentrated hydrochloric acid. The reaction mixture is extracted with ether and the ethereal extract is dried over anhydrous sodium sulfate. Upon concentration in vacuo, the ether yields an oil which is separated and refluxed with 75 parts by volume of 10% sodium hydroxide for 6 hours. The mixture is then cooled to 10°, acidified with hydrochloric acid to Congo red and extracted with ether. The ethereal solution is dried over anhydrous sodium sulfate and concentrated to produce 3.5 parts of an oily residue of 2-phenoxy-5-ethoxymethylbenzoic acid. The oil is dissolved in 50 parts by volume of ethanol, to which the calculated amount (0.9 part) of sodium hydroxide in 50 parts by volume of 95% ethanol is added. The solution is concentrated whereupon a yellowish residue of sodium 2-phenoxy-5-ethoxymethylbenzoate is obtained. After recrystallization from ethanol, it melts at 216–217°. The yield is 6 parts.

EXAMPLE 14.—2 METHOXY-5-HYDROXYMETHYLBENZOIC ACID 10 parts of 2-methoxy-5-chloromethylbenzoic acid are refluxed with 100 parts by volume of 10% sodium hydroxide for 3 hours. The resulting mixture is cooled and acidified to Congo red with concentrated hydrochloric acid. The oil which separates is extracted with ethyl acetate. The extract is dried over anhydrous sodium sulfate, the sodium sulfate is filtered off, and the ethyl acetate solution is concentrated to a small volume. The residual oil crystallizes in several hours at ice-bath temperature and is recrystallized from benzene. The white crystalline product of 2-methoxy-5-hydroxymethylbenzoic acid melts at 90–91°. The yield is 4 parts (48%).

EXAMPLE 15.—POTASSIUM 2-METHOXY-5-ETHOXYMETHYLBENZOATE 84.4 parts of 2-methoxy-5-ethoxymethylbenzoic acid, prepared according to Example 1, are dissolved in 200 parts by volume of ethanol. To this solution is added the calculated amount of potassium hydroxide dissolved in 200 parts by volume of 95% ethanol. The reaction mixture is then concentrated in vacuo, whereupon a white crystalline residue of potassium 2-methoxy - 5 - ethoxymethylbenzoate is obtained. After recrystallization from isopropyl alcohol, its melts at 191–192°. The yield is 75 parts (82.5%).

EXAMPLE 16.—2 CHLORO-5-HYDROXYMETHYLBENZOIC ACID (a) *Synthesis of Starting Materials*

Methyl 2-chloro-5-methylbenzoate is prepared by refluxing 2-chloro-5-methylbenzoic acid (described in Example 13a) for 3 days with a mixture of methanol, ethylene dichloride and a trace of sulfuric acid [Clinton and Laskowski, J. Am. Chem. Soc., 70, 3136 (1948)]. The fraction, boiling at 90° under a pressure of 1.2 mm. Hg, is collected. It has $n_D^{25}$ 1.5335.

Methyl 2-chloro-5-bromomethylbenzoate is prepared by brominating methyl 2-chloro-5-methylbenzoate with N-bromosuccinimide in carbon tetrachloride. The carbon tetrachloride is evaporated and the compound dissolved in benzene. It is then passed through neutral aluminum oxide and the benzene is evaporated. A yellow viscous oil is obtained.

(b) *2-Chloro-5-Hydroxymethylbenzoic Acid*

5 parts of methyl 2-chloro-5-bromoethylbenzoate are refluxed with 25 parts by volume of 10% aqueous sodium hydroxide for about 3 hours. The resulting solution is acidified to pH 3.5 with concentrated hydrochloric acid. The liberated acid is extracted with ether (two 100 part by volume portions) and the extracts are dried over anhydrous sodium sulfate. Upon evaporation of the ether, a white crystalline residue of 2-chloro-5-hydroxymethylbenzoic acid is obtained. After recrystallization from 95% ethanol it melts at 158–160°. The yield is 2.3 parts (66.6%).

EXAMPLE 17.—2-ETHOXY-5-HYDROXYMETHYLBENZOIC ACID 21 parts of 2-ethoxy-4-chloromethylbenzoic acid are refluxed with 100 parts by volume of 10% aqueous sodium hydroxide for 6 hours. The resulting mixture is cooled and acidified to Congo red with concentrated hydrochloric acid. The oil which separates is extracted with ethyl acetate and dried over anhydrous sodium sulfate. The dry ethyl acetate solution is then concentrated to a syrupy consistency which crystallizes after several hours at ice-bath temperature. The white crystalline product of 2-ethoxy-5-hydroxymethylbenzoic acid is recrystallized from a 9:1 mixture of ethyl acetate and ether. The compound melts at 48–50°. The yield is 9 parts (46%).

EXAMPLE 18.—2-CHLORO-5-(n-BUTOXYMETHYL)-BENZOIC ACID

*(a) Synthesis of Starting Material*

Methyl 2chloro-5-n-butoxymethylbenzoate is prepared by refluxing sodium n-butoxide with methyl 2-chloro-5-bromomethylbenzoate (prepared as described in Example 16a) in a mixture of n-butanol and benzene. The solvent is evaporated and water is added to the residue. The reaction mixture is extracted with ether three times. The combined ethereal extracts are dried over anhydrous sodium sulfate and evaporated. The residue is distilled and the fraction, boiling above 175° under a pressure of 2.8 mm. Hg is collected. The yield is 10 parts (33%).

*(b) 2-Chloro-5-(n-Butoxymethyl)-Benzoic Acid*

10 parts of methyl 2-chloro-5-n-butoxymethylbenzoate are refluxed with 10% aqueous sodium hydroxide for about 2½ hours. The solution is acidified with concentrated hydrochloric acid to Congo red and extracted with ether. The dried ether extract is concentrated to a small volume whereupon the white crystalline compound of 2-chloro-5-(n-butoxymethyl)-benzoic acid is obtained. It is recrystallized twice from water and melts at 88–89°. The yield is 1.1 parts.

EXAMPLE 19.—SODIUM 2-METHOXY-5-HEXYLOXYMETHYLBENZOATE

A solution of sodium hexylate is prepared from 1.3 parts of sodium and 200 parts by volume of n-hexyl alcohol. To this solution are added 10 parts of 2-methoxy-5-chloromethylbenzoic acid, dissolved in 75 parts by volume of benzene. The mixture is stirred under reflux for 8 hours and is then concentrated in vacuo. The residue is suspended in 100 parts by volume of water. The pH is adjusted to 11 with 10% sodium hydroxide and the solution is extracted with two portions (50 parts by volume each) of ether. The extracts are discarded. The remaining aqueous solution is acidified with concentrated hydrochloric acid to Congo red. The liberated acid is extracted from the mixture with two 100 part by volume portions of ether. The ethereal solution is dried over anhydrous sodium sulfate. The drying agent is filtered off and the filtrate distilled to remove the ether. The oily residue is dissolved in ethanol and the calculated amount of sodium hydroxide, dissolved in alcohol, is added. After concentration in vacuo of the mixture a white crystalline residue of sodium 2-methoxy-5-hexyloxymethylbenzoate is obtained. Upon recrystallization from a 2:1 mixture of ethanol and methanol it melts at 265–266°. The yield is 7 parts (50%).

EXAMPLE 20.—SODIUM 2-METHOXY-5-PROPOXYMETHYLBENZOATE 1.3 parts of sodium are dissolved in 250 parts by volume of n-propyl alcohol. To this solution is added a solution of 10 parts of 2-methoxy-5-chloromethylbenzoic acid in 100 parts by volume of benzene. The mixture is stirred and refluxed for 6 hours and worked up in the same manner as described in Example 3. The crude residue of sodium 2-methoxy-5-propoxymethylbenzoate is taken up in the minimum volume of ethanol. To this solution ether is added until the first signs of turbidity. The crystalline precipitate is filtered off and melts at 259–261°. The yield is 14 parts.

EXAMPLE 21.—2-METHOXY-5-ETHYLMERCAPTOMETHYLBENZOIC ACID

*(a) Synthesis of Starting Material*

METHYL 2-METHOXY-5-ETHYLMERCAPTOMETHYLBENZOATE 6.2 parts of ethylmercaptan are dissolved in 200 parts by volume of ether. To this solution is added 2.3 parts of sodium over a time period of 7 hours. The sodium salt of ethylmercaptan precipitates. A solution of 21.5 parts of methyl 2-methoxy-5-chloromethylbenzoate in 150 parts by volume of ether is then added. The resulting mixture is stirred and refluxed for 19 hours. This reaction mixture is then cooled to 10° and is treated with 50 parts by volume of water. The ether layer is separated from the aqueous layer and is dried over anhydrous sodium sulfate. The sodium sulfate is filtered off and the filtrate is evaporated. The residual oil is distilled in vacuo and the fraction is collected which distills at 162–164° (1.22 mm. Hg); the yield of methyl 2-methoxy-5-ethylmercaptomethylbenzoate is 15 parts (62.5%).

*(b) 2-Methoxy-5-Ethylmercaptomethylbenzoic Acid*

Methyl 2-methoxy-5-ethylmercaptomethylbenzoate (15 parts) is refluxed with 40 parts by volume of 10% aqueous sodium hydroxide for 4½ hours. The reaction mixture is cooled to 0° and made acid to Congo red with concentrated hydrochloric acid. The crude oily precipitate crystallizes on cooling and trituration. It is recrystallized from the minimum volume of a 3:1 water-alcohol solution. The product, 2-methoxy-5-ethylmercaptomethylbenzoic acid melts at 84–86°. The yield is 10 parts (78%).

EXAMPLE 22.—2-METHOXY-5-ETHYLSULFONYLMETHYLBENZOIC ACID

To a solution of 2.26 parts of 2-methoxy-5-ethylmercaptomethylbenzoic acid in 15 parts by volume of glacial acetic acid warmed to 70° (in an oil bath) are added slowly, while stirring, 5.7 parts of 32% hydrogen peroxide. The resulting mixture is stirred at 70° for three hours. This reaction mixture is then concentrated in vacuo. To the remaining oil, 50 parts by volume of water are added. The oil crystallizes when cooled in an ice bath and triturated. Recrystallization from hot ethanol gives pure 2-methoxy-5-ethylsulfonylmethylbenzoic acid which melts at 152–153°; the yield is 2.4 parts.

EXAMPLE 23.—2-METHOXY-4-ETHOXYMETHYLBENZOIC ACID

*(a) Synthesis of Starting Materials*

METHYL 2-METHOXY-4-BROMOMETHYLBENZOATE

A mixture of 51 parts of methyl 2-methoxy-4-methylbenzoate, 52.4 parts of N-bromosuccinimide, 12 parts of benzoperoxide and 600 parts by volume of carbon tetrachloride is stirred and refluxed until the mixture decolorizes (12 hours). The succinimide is filtered off and the filtrate is concentrated in vacuo. The residual oil is dissolved in 500 parts by volume of benzene, chromatographed on a column of neutral aluminum oxide and eluted with 200 parts by volume of benzene. The benzene is removed by distillation and the residual oil is fractionated. Methyl 2-methoxy-4-bromomethylbenzoate is collected at 142–146° (1.8 mm. Hg); the yield is 40 parts.

METHYL 2-METHOXY-4-ETHOXYMETHYLBENZOATE

A solution of sodium ethylate is prepared from 2.2 parts of sodium and 100 parts by volume of absolute ethanol. To this solution are added 24.3 parts of methyl 2-methoxy-4-bromomethylbenzoate dissolved in 100 parts by volume of benzene. The mixture is stirred and refluxed for 12 hours and concentrated in vacuo. 100 parts by volume of water are added to the residue; the mixture is made acid to Congo red with concentrated hydrochloric acid and is extracted with three 100 parts by volume portion of ether. The extracts are washed with water (3 portions, 50 parts by volume) and are combined and dried over anhydrous sodium sulfate. The drying agent is filtered off and the solvent is removed by distillation at atmospheric pressure. The residual oil is distilled and the fraction is collected which distills at 130–133° (1.8 mm. Hg); the yield is 6 parts.

(b) 2-Methoxy-4-Ethoxymethylbenzoic Acid

Six parts of methyl 2-methoxy-4-ethoxymethylbenzoate are refluxed with 200 parts by volume of 10% aqueous sodium hydroxide for 4 hours. The reaction mixture is cooled to 10° and is then extracted with 3 portions (20 parts by volume each) of benzene. The benzene extracts are discarded and the aqueous layer is acidified to pH 3.5 with concentrated hydrochloric acid while maintaining a temperature of 20°±5°. The oily layer which separates is extracted with ethyl acetate (2 portions, 50 parts by volume). The extracts are washed neutral and dried over anhydrous sodium sulfate. The drying agent is filtered off and the filtrate is concentrated in vacuo. The oily residue crystallizes when refrigerated and is recrystallized from an ethyl acetate:petroleum ether mixture (2:1). The product melts at 35–38°; the yield is 2 parts.

EXAMPLE 24.—2-METHOXY-3-ETHOXYMETHYLBENZOIC ACID

(a) Synthesis of Starting Materials

METHYL 2-METHOXY-3-BROMOMETHYLBENZOATE

A mixture of 36 parts of methyl 2-methoxy-3-methylbenzoate, 35.6 parts of N-bromosuccinimide, 10 parts of benzoperoxide and 500 parts by volume of carbon tetrachloride is stirred and refluxed until the reaction mixture decolorizes (3 hours). The reaction is worked up in the same way described for the preparation of methyl 2-methoxy-4-bromomethylbenzoate in Example 23a. The yield is 40 parts of methyl 2-methoxy-3-bromomethylbenzoate which distills at 115–118° (0.35 mm. Hg).

METHYL 2-METHOXY-3-ETHOXYMETHYLBENZOATE 40 parts of methyl 2-methoxy-3-bromomethylbenzoate are dissolved in 200 parts by volume of benzene. This solution is added to a solution of sodium ethoxide prepared from 3.6 parts of sodium and 200 parts by volume of absolute ethanol. The mixture is stirred and refluxed for 4 hours and worked up in the same manner as that employed for the workup of methyl 2-methoxy-4-ethoxymethylbenzoate described in Example 23a. The crude reaction product is fractionated in vacuo to constancy of a refractive index $n_D^{25}$ 1.5053. The fraction boils at 102° (0.1 mm. Hg). The yield is 17.5 parts.

(b) 2-Methoxy-3-Ethoxymethylbenzoic Acid 10.5 parts of methyl 2-methoxy-3-ethoxymethylbenzoate is refluxed with 10% aqueous sodium hydroxide and worked up in the same way as described for the preparation of 2-methoxy-4-ethoxymethylbenzoic acid in Example 23b. The yield of 2-methoxy-3-ethoxymethylbenzoic acid is 3 parts.

EXAMPLE 25.—2-METHOXY-3-METHYL-5-ETHOXYMETHYLBENZOIC ACID

(a) Synthesis of Starting Material

2-METHOXY-3-METHYL-5-CHLOROMETHYLBENZOATE 15.3 parts by volume of formalin are added slowly to a suspension of 29 parts of 2-methoxy-3-methylbenzoic acid in 13 parts by volume of concentrated hydrochloric acid while maintaining a reaction temperature of 10°. Hydrogen chloride gas is then introduced into the resulting mixture until the saturation point is reached. The temperature of the reaction mixture is maintained during this operation at 5°±2°. The starting material gradually dissolves and then crystallizes from the reaction mixture. It is removed by filtration after 4 hours of standing and is recrystallized from hot benzene; 17 parts of 2-methoxy-3-methyl-5-chloromethylbenzoic acid are obtained which melt at 186–187°.

(b) 2-Methoxy-3-Methyl-5-Ethoxymethylbenzoic Acid 6.3 parts of 2-methoxy-3-methyl-5-chloromethylbenzoic acid are converted to 2-methoxy-3-methyl-5-ethoxymethylbenzoic acid by the same method described for the preparation of 2-methoxy-5-ethoxymethylbenzoic acid (Example 1). The crude acid is recrystallized by suspending it in 9 parts by volume of hot water. Addition of one part by volume of isopropanol causes the acid to dissolve. On cooling, 4.6 parts of precipitated crystals are filtered off; they melt at 80–81°.

If, in part (a) of Example 25, 41 parts of 2-methoxy-3-n-hexylbenzoic acid are employed in place of 29 parts of 2-methoxy-3-methylbenzoic acid, then 5-chloromethyl-2-methoxy-3-n-hexylbenzoic acid is obtained. The 5-chloromethyl-2-methoxy-3-n-hexylbenzoic acid is then converted to 5-ethoxymethyl-2-methoxy-3-n-hexylbenzoic acid by the same method described in Example 1 for the preparation of 5-ethoxymethyl-2-methoxybenzoic acid.

This application is a continuation-in-part of my earlier filed application Ser. No. 53,906, filed September 6, 1960, now abandoned.

What is claimed is:
1. A compound selected from the class consisting of
   (a) the free acids of the formula

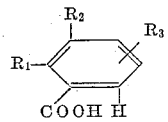

wherein
   $R_1$ is a member selected from the group consisting of lower alkoxy, phenoxy and halogen,
   $R_2$ is a member selected from the group consisting of lower alkyl and hydrogen and
   $R_3$ is a member selected from the group consisting of lower alkoxymethyl, carboxymethoxymethyl, lower alkenoxymethyl, lower alkynoxymethyl, cycloalkoxymethyl, having from 6 to 7 carbon atoms, lower haloalkoxymethyl, lower hydroxyalkoxymethyl, phenyl-lower alkoxymethyl, lower alkylmercaptomethyl, lower alkylsulfonylmethyl, hydroxymethyl, and
(b) the addition salts thereof with pharmaceutically acceptable non-toxic bases.
2. 2-methoxy-5-ethoxymethylbenzoic acid.
3. 2-methoxy-5-hydroxymethylbenzoic acid.
4. 2-methoxy-5-n-butoxymethylbenzoic acid.
5. 2-methoxy-5-methoxymethylbenzoic acid.
6. 2-ethoxy-5-ethoxymethylbenzoic acid.

References Cited in the file of this patent

Budisinsky et al.: Chemical Abstracts, vol. 49, page 3879 (1955).